United States Patent [19]

De Briel

[11] Patent Number: 4,772,248

[45] Date of Patent: Sep. 20, 1988

[54] VARIABLE SPEED DRIVE SYSTEM AND PULLEY THEREFOR

[75] Inventor: Jacques T. De Briel, Levallois Perret, France

[73] Assignee: Valeo, Paris, France

[21] Appl. No.: 45,516

[22] Filed: May 4, 1987

[30] Foreign Application Priority Data

May 7, 1986 [FR] France .................. 86 06662

[51] Int. Cl.⁴ .................................................. F16H 11/02
[52] U.S. Cl. ........................................................ 474/14
[58] Field of Search ..................................... 474/11–14

[56] References Cited

U.S. PATENT DOCUMENTS 4,432,743  2/1984  Pitoiset ............................. 474/1 X
4,617,005  10/1986  Jaccod et al. ..................... 474/1 X

*Primary Examiner*—Thuy M. Bui
*Attorney, Agent, or Firm*—Charles E. Brown; Charles A. Brown

[57] ABSTRACT

A variable speed drive system comprises a driving pulley, a driven pulley and a drive belt passing around the two pulleys. Each pulley comprises a hub and two annular flanges on the hub between which the drive belt passes. One flange is movable axially relative to the hub so that the belt is able to assume different radial positions relative to the hub. An annular diaphragm spring acts on the movable flange in the axial direction. A central part of this diaphragm spring is in axial rocking bearing engagement against an annular abutment member fastened to the hub. Flyweights constrained to rotate with the diaphragm are arranged to deform it, by virtue of the centrifugal force developed as a result of such rotation, in the direction which tends to move the movable flange towards the other flange. The diaphragm has a force/axial deformation characteristic which features a neutral point at which the force changes direction. As a result, the diaphragm opposes the action of the flyweights after the movable flange has moved a particular distance towards the other flange. Optionally, a spring cooperates with the movable flange of the driven pulley to urge it axially towards the other flange. This can be a coil spring around the hub and bearing on the movable flange of the driven pulley and on the annular abutment member.

6 Claims, 3 Drawing Sheets

VARIABLE SPEED DRIVE SYSTEM AND PULLEY THEREFOR

BACKGROUND OF THE INVENTION

1. Field of the Invention

The invention is generally concerned with a variable speed drive pulley of the kind comprising a hub and, facing one another on this hub, two annular flanges with frustoconical surfaces between which a drive belt can be gripped to transmit a given torque.

It is more particularly concerned with an improvement to this type of pulley whereby the gripping of the belt can be stabilized whatever the rotation speed of the pulley, to minimize wear of the belt.

It is also concerned with a variable speed drive system comprising two pulleys of the known kind described above, namely a driving pulley and a driven pulley, and a drive belt disposed between these two pulleys, the improvement of the invention being more specifically concerned with the driven pulley.

2. Description of the Prior Art

A known type of variable speed drive system comprises two pulleys, namely a driving pulley and a driven pulley, each comprising a hub, and, facing each other, two annular flanges with frustoconical surfaces at least one of which is a movable flange mounted so as to be able to move axially relative to its own hub. A drive belt is disposed between the two pairs of flanges of the two pulleys. The distance between the flanges in each pair thus determines the position of the belt between the pulleys and, consequently, the ratio between the rotation speed of the driving shaft and that of the driven shaft. In each pulley the movable flange has an axial force applied to it by spring means comprising an annular diaphragm one part of which forms a Belleville spring washer. The central part of the diaphragm nearest the hub, divided into radial fingers, is in axial rocking bearing engagement against an annular abutment member fastened to the hub. In conventional practise the diaphragm is prestressed between the annular abutment member and the movable flange in such a way that the belt is gripped between the two flanges, irrespective of its position, so as to be able to transmit a particular torque. Also, there are flyweights constrained to rotate with the diaphragm, generally being fixed to it, in order to deform it in a direction tending to urge the movable flange of the pulley axially towards the other flange, by virtue of the centrifugal forces produced. Because the flyweights are fixed to the diaphragm spring, which deforms, the "lever arm" of the flyweights increases in the case of the driven pulley as the two flanges of the pulley move towards each other, with the result that when the belt is gripped between the outer parts of the flanges the gripping forces are too high relative to the torque to be transmitted. This can result in premature wearing of the belt. A variable speed drive system of this kind is described in French Patent No. 2 522 765. One solution (considered in this document in respect of the driving pulley) would be to articulate the flyweights to the diaphragm spring in such a way that the "lever arm" would vary to only a limited extent as the diaphragm deforms. An arrangement of this kind would be costly, however. An object of the invention is to solve this problem with much simpler means.

SUMMARY OF THE INVENTION

In one aspect, the invention consists in a variable speed drive pulley comprising a hub, two annular flanges on said hub adapted to have a drive belt pass between them and one of which is movable axially relative to said hub whereby said belt is able to assume different radial positions relative to said hub, spring means comprising an annular diaphragm having a portion forming a Belleville spring washer axially operative on said movable flange, an annular abutment member fastened to said hub against which a central part of said diaphragm is in axial rocking bearing engagement, and flyweights constrained to rotate with said diaphragm and adapted to deform said diaphragm by virtue of centrifugal forces developed as a result of such rotation in a direction tending to move said movable flange axially towards the other flange, wherein said diaphragm has a force/axial deformation characteristic which features a neutral point at which the force changes direction whereby said diaphragm opposes the action of said flyweights after said movable flange has moved a particular distance towards said other flange.

In another aspect, the invention consists in a variable speed drive system comprising a drive belt passing around driving and driven pulleys the latter of which is as defined in the preceding paragraph.

In a variable speed drive comprising a driving and a driven pulley the improvement of the invention is applied to the driven pulley. In the common application of such drives to regulating the speed at which an automobile alternator is driven, with the driving pulley rotationally coupled to the motor output shaft and the driven pulley mounted on the alternator drive shaft, the flyweights are simply fixed to the diaphragm in the driven pulley and their "lever arm" can increase without problems arising because, from a particular deformation of the diaphragm pushing the movable flange towards the other flange the diaphragm's characteristic reverses and it begins to oppose the flyweights. A substantially constant torque is transmitted and the force gripping the belt is stabilized. The force/axial travel characteristic depends on the specific application and is within the competence of those skilled in the art. Whether a variable speed drive pulley is equipped with a diaphragm in accordance with the invention is shown by the fact that with no rotation (no centrifugal force on the flyweights) and with the belt removed or in a position near the outside edge of the flanges, the movable flange has no axial force applied to it by the diaphragm.

Another problem may arise when the variable speed drive system is equipped with a driving pulley the movable flange of which is coupled to means controlling the distance between the corresponding flanges, no longer relying primarily on centrifugal force. Such control means may be as described in U.S. Pat. No. 4,573,948, for example, in which the diaphragm forms part of a sealed chamber subject to depressurization, the degree of depressurization determining the axial position of the movable flange. This type of variable speed drive, governed by depressurization in accordance with certain operating parameters of the motor, may be used to drive a supercharger. In this case it is undesirable for the supercharger to be driven at high speed when the motor is idling. The degree of depressurization in the sealed chamber of the driving pulley is therefore determined according to the boost requirements of the motor at various speeds and, for certain of these speeds, the driven pulley may be driven at a relatively low speed with the drive belt positioned towards the outside of its flanges. In this case the force developed by the flyweights may be insufficient to ensure that the belt is gripped correctly (so as to be able to transmit the required torque), given the specific characteristics of the diaphragm.

Under these conditions, and in accordance with a further characteristic of the invention, a spring cooperates with the movable flange of the driven pulley to urge it axially towards the other flange of the driven pulley. The spring, which thus ensures a minimal gripping force on the belt, is preferably a coil spring disposed around the hub of the driven pulley and bearing on the movable flange and the previously mentioned annular abutment member.

The invention will be better understood and other advantages of the invention will emerge more clearly from the following description of two embodiments of a variable speed drive system in accordance with the invention given by way of example only and with reference to the accompanying drawings.

DESCRIPTION OF THE PREFERRED EMBODIMENTS

Figure 1:
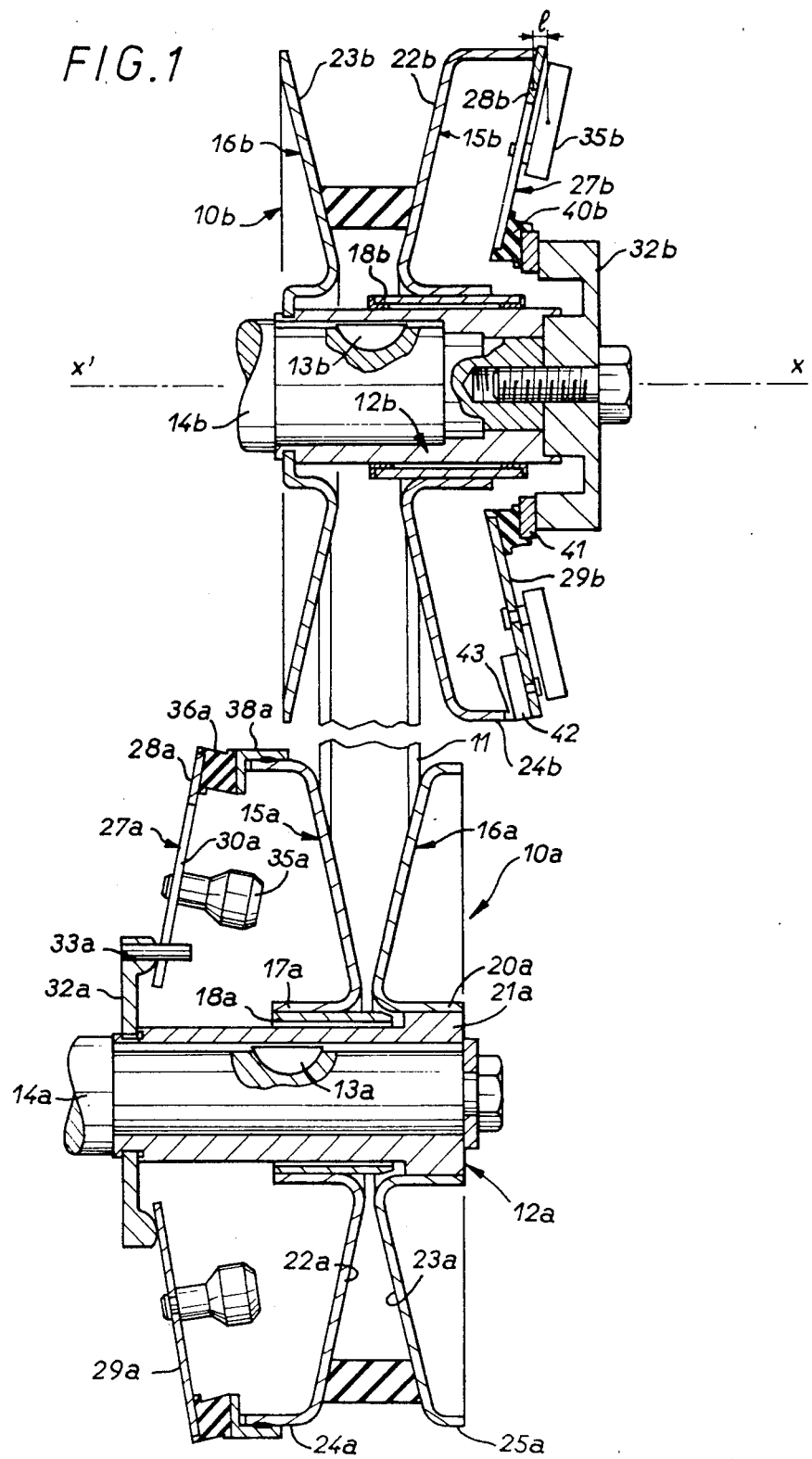
FIG. 1 is a view in axial cross-section of a variable speed drive system in accordance with the invention.

With particular reference to FIG. 1, the variable speed drive system shown comprises in the conventional way a driving pulley 10a, a driven pulley 10b and a belt 11 passing in an endless loop around the pulleys. The driving pulley 10a comprises a hub 12a which is constrained to rotate with a drive shaft 14a by a key 13a. Two annular flanges 15a, 16a are mounted on the hub 12a facing each other. At least the flange 15a is movable axially relative to the hub 12a and is called the movable flange. To this end, the flange 15a comprises in its central area an axial bush 17a through which it is attached to a bush 18a which can slide with clearance on the hub 12a. The other flange 16a is fastened to the hub 12a and therefore fixed in the axial direction. It is attached by an axial bush 20a to a collar 21a on the hub 12a.

The flanges 15a, 16a have frustoconical surfaces 22a, 23a facing towards each other and oppositely inclined; the belt 11 consequently has a trapezoidal cross-section. The flanges 15a and 16a have upstanding rims 24a, 25a parallel to the axis of the shaft 14a and directed away from each other. The movable flange 15a is urged towards the fixed flange 16a by spring means comprising an annular member 27a or diaphragm which has a peripheral part 28a forming a Belleville spring washer in axial rocking bearing engagement against the movable flange 15a and a central part divided into radial fingers 29a by slots 30a in axial rocking bearing engagement against an annular abutment member 32a fastened to the hub 12a. In this case the annular abutment member is crimped onto the hub 12a and features spaced axially projecting pegs 33a inserted in respective slots 30a in the diaphragm in order to entrain the latter in rotation.

The radial fingers 29a of the diaphragm 27a carry spaced flyweights 35a which, in the case of a driving pulley, project from the side of the diaphragm 27a facing towards the movable flange 15a. In other words, these flyweights are disposed between the diaphragm 27a and the flange 15a. An elastic material spacer 36a is bonded between the peripheral part 28a of the diaphragm and an annular auxiliary member 38a of L-shaped cross-section welded to the edge of the axial rim 24a of the movable flange 15a, as described in U.S. Pat. No. 4,559,026. Thus the annular spacer 36a procures both axial rocking bearing engagement of the diaphragm 27a on the movable flange 15a and entrainment of the latter in rotation through the intermediary of the diaphragm.

In all essentials the driven pulley 10b is highly similar to the driving pulley 10a and for this reason analogous structural members carry the same reference numerals but with the suffix b. There are therefore a hub 12b keyed by a key 13b to the driven shaft 14b, a movable flange 15b that can move axially relative to the hub 12b and a fixed flange 16b fastened to the hub. The facing surfaces 22b, 23b of the two flanges are frustoconical and oppositely inclined. The axial bush 17b of the movable flange is fastened to a bush 18b sliding with clearance on the hub 12b. The diaphragm spring 27b adapted to urge the movable flange 15b towards the fixed flange 16b comprises, as previously, a peripheral part 28b forming a Belleville spring washer in axial rocking bearing engagement against the movable flange and a central part divided into radial fingers 29b by slots in axial rocking bearing engagement against an annular abutment member 32b fastened to the hub 12. This axial rocking bearing engagement is achieved through the intermediary of an annular spacer 40b bonded between the inside periphery of the diaphragm and a metal bearing dish 41 inserted between the spacer 40b and the annular abutment member 32b. The diaphragm 27b carries flyweights 35b which, in the case of the driven pulley, project from the side thereof facing away from the movable flange 15b. In other words, the flyweights 35b are disposed outside the volume delimited by the movable flange and the diaphragm. The movable flange is entrained in rotation by the diaphragm through the intermediary of shaped linking members constituted by projecting elements 42 usually referred to as "drive blocks" riveted to the diaphragm 27b and inserted in corresponding notches 43 provided along the axial rim 24b of the movable flange 15b. This arrangement provides some degree of play parallel to the axis of the hub. An alternative known arrangement with complementary corrugations could be substituted for this arrangement.

Figure 2:
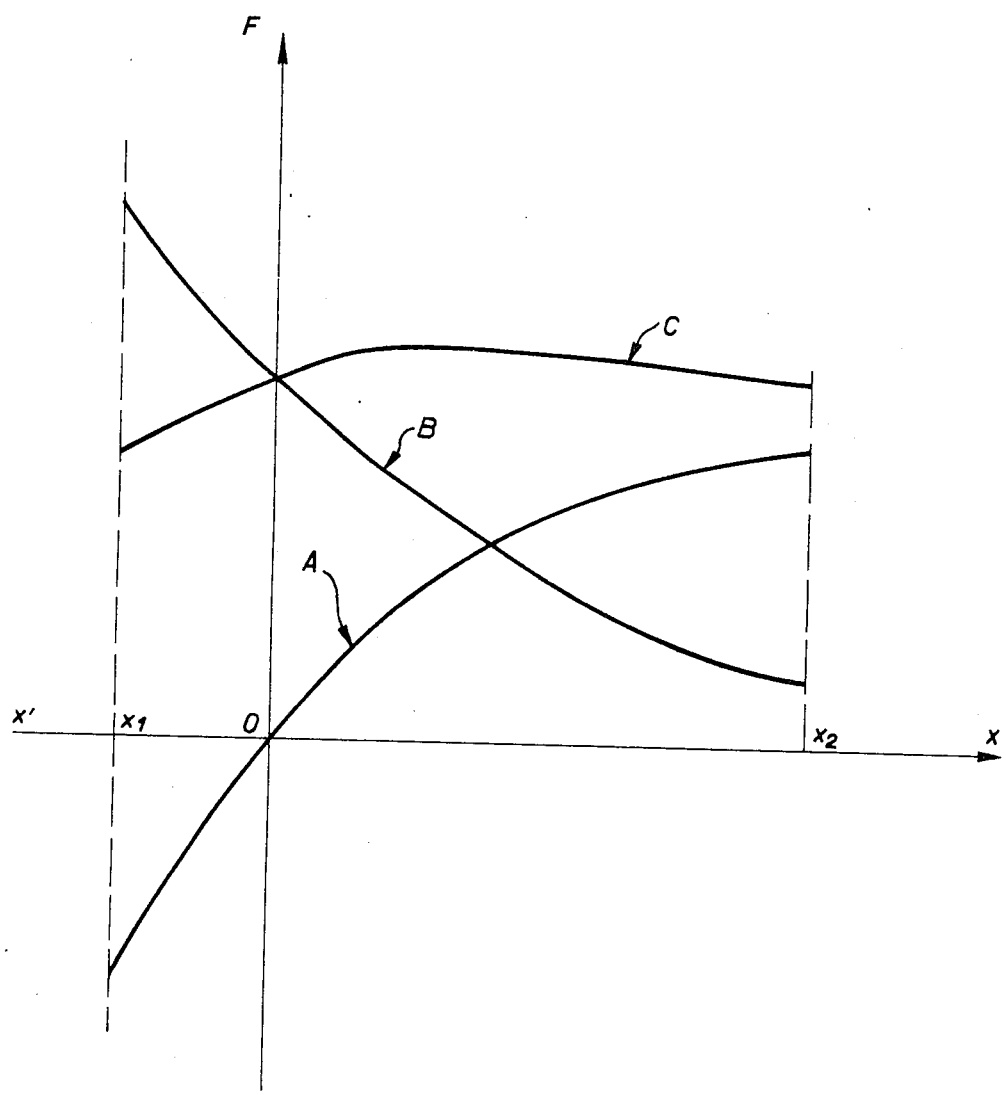
FIG. 2 is a graph showing the characteristic of the diaphragm of the driven pulley of the variable speed drive system from FIG. 1.

The "lever arm" through which the flyweights 35b are operative on the diaphragm 27b is defined by the projection 1 along the axis X'X of the shaft 14b of the distance between the center of gravity of any flyweight 35b and the imaginary pivoting point substantially corresponding to the middle of the Belleville washer of the diaphragm 27b in the radial plane containing said center of gravity. It will be understood that as the flanges 15b and 16b move towards each other this "lever arm" increases, which accentuates the gripping of the belt 11. This phenomenon is illustrated in FIG. 2 by the curve B which shows the axial force F exerted by the flyweights 35b on the mobile flange 22b as a function of the position of the latter along the axis X'X as defined hereinabove, the points with abscissae $x_1$ and $x_2$ respectively corresponding to the minimum and maximum separation of the flanges 15b and 16b. The curves in FIG. 2 correspond to a variable speed drive system used as a centrifugal regulator the function of which is to stabilize as much as possible the rotation speed of the shaft 14b irrespective of the rotation speed of the shaft 14a, as described in the previously mentioned French Pat. No. 2 522 765.

In accordance with the invention, the diaphragm 27b has a force/axial deformation characteristic featuring a neutral point O at which the force changes direction so as to oppose the action of the flyweights 35b after the flanges 15b and 16b have moved together by a particular amount. A characteristic of this kind is shown by the curve A in FIG. 2. Along the travel $Ox_2$ of the movable flange 15b the force resulting from deformation of the diaphragm is exerted in the same direction as that which results from the centrifugal force exerted on the flyweights. The belt 11 is thus gripped with the sum of these two forces. As the flanges 22b, 23b move close together, however, the force associated with the diaphragm 27b decreases to the point where it is cancelled out and is then reversed over the travel $Ox_1$ and opposes that of the flyweights. The neutral point O is generally nearer the point $x_1$ than the point $x_2$. This results in a relative stabilization of the force with which the belt 11 is gripped for any position of the movable flange, adjusted to enable transmission of a given maximum torque conditioned by the devices driven by the shaft 14b. The curve C in FIG. 2 shows the axial gripping force on the belt 11.

Figure 3:
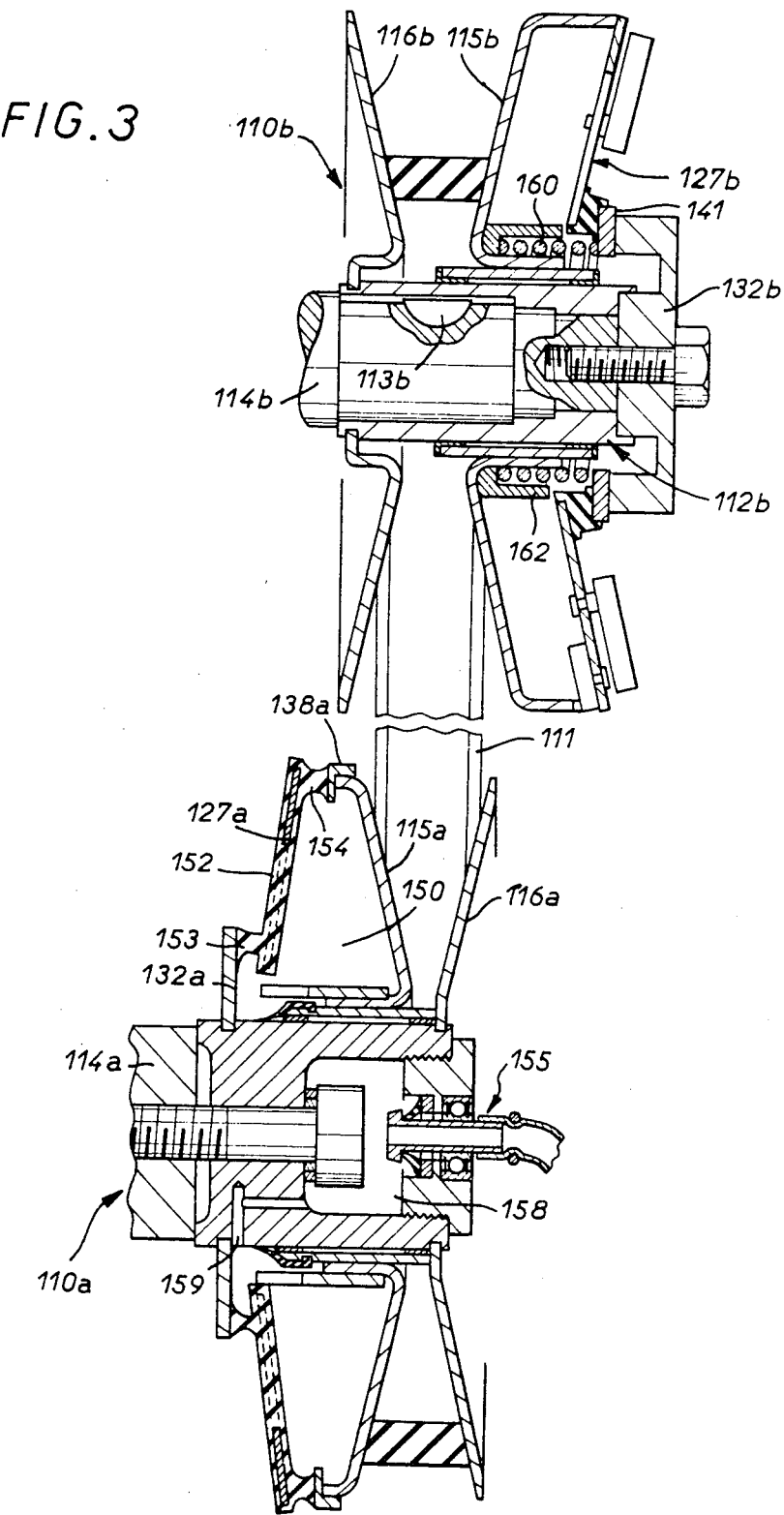
FIG. 3 is a view analogous to that of FIG. 1 showing an alternative embodiment of variable speed drive system in accordance with the invention.

Referring specifically to FIG. 3, there is shown an alternative embodiment of variable speed drive system in which structural members analogous to those of FIG. 1 carry the same alphanumeric references increased by 100. These analogous structural members will not be described again.

However, the driving pulley 110a comprises a number of modifications and the distance between its flanges is no longer controled by the centrifugal action of flyweights (the flyweights 35a have been eliminated) but by depressurization of a sealed chamber 150 delimited in part by the diaphragm 127a and the movable flange 115a. To achieve this the diaphragm 127a is entirely embedded within a mass of elastomer material 152 bonded through annular beads 153 and 154 to the annular abutment member 132a and the annular member 138a, respectively. The chamber 150 is depressurized through an axial nozzle 155 discharging into an intermediate chamber 158 and provided with an annular seal. The chamber 158 communicates with the chamber 150 through bores 159.

The driven pulley 110b and its diaphragm 127b have essentially the same characteristics as those of the pulley 10b. With this arrangement, however, the position of the belt 111 is no longer conditioned essentially by the rotation speed of the driving shaft 114a but rather by the depressurization of the chamber 150 in accordance with selected parameters representative of the operational state of the motor.

As already mentioned, operating conditions may be such that the speed at which the driven pulley 110b is driven is relatively low and the belt 110 is positioned near the outside edge of the flanges 115b and 116b. Under such conditions the force with which the belt is gripped may be insufficient to transmit the necessary torque (see FIG. 2). For this reason, and in accordance with another feature of the invention, there is provided a spring 160 cooperating with the movable flange 115b of the driven pulley to urge it axially towards the fixed flange 116b. In this instance the spring 160 is a simple coil spring disposed around the hub 112b between the flange 115b and the annular abutment member 132b. This spring thus imposes a minimal gripping force on the belt 11. It bears on the flange 115b through an annular member 162 comprising a tubular sleeve accommodating most of the spring. This arrangement improves the centering of the spring and, more importantly, prevents it deforming as a result of centrifugal force. This sleeve could equally well be defined by a tubular extension of the annualar abutment member 132b or of the bearing dish 141.

I claim:

1. Variable speed drive pulley comprising a hub, two annular flanges on said hub adapted to have a drive belt pass between them and one of which is movable axially relative to said hub whereby said belt is able to assume different radial positions relative to said hub, spring means comprising an annular diaphragm having a portion forming a Belleville spring washer axially operative on said movable flange, an annular abutment member fastened to said hub against which a central part of said diaphragm is in axial rocking bearing engagement, and flyweights constrained to rotate with said diaphragm and adapted to deform said diaphragm by virtue of centrifugal forces developed as a result of such rotation in a direction tending to move said movable flange axially towards the other flange, said diaphragm being axially deformable in a first direction and having a neutral point beyond which said diaphragm moves in a second direction opposing the action of said flyweights after said movable flange has moved a particular distance towards said other flange.

2. Pulley according to claim 1, further comprising shaped linking members at the outside edge of said diaphragm whereby said diaphragm is linked rotationally to said movable flange but some play is provided in the direction parallel to the axis of said hub.

3. Pulley according to claim 1, further comprising an annular spacer bonded between said central part of said diaphragm and said annular abutment member and through which said diaphragm bears on said annular abutment member.

4. Variable speed drive system comprising a driving pulley, a driven pulley and a drive belt passing around said driving and driven pulleys, wherein each of said driving and driven pulleys comprises a hub and two annular flanges on said hub adapted to have said drive belt pass between them and one of which is movable axially relative to said hub whereby said belt is able to assume different radial positions relative to said hubs, defining different transmission ratios, and wherein said driven pulley comprises spring means comprising an annular diaphragm having a portion forming a Belleville spring washer axially operative on said movable flange, an annular abutment member fastened to said hub against which a central part of said diaphragm is in axial rocking bearing engagement, and flyweights constrained to rotate with said dipahragm and adapted to deform said diaphragm by virtue of centrifugal forces developed as a result of such rotation in a direction tending to move said movable flange axially towards the other flange, and said diaphragm being axially deformable in a first direction and having a neutral point beyond which said diaphragm moves in a second direction opposing the action of said flyweights after said movable flange has moved a particular distance towards said other flange.

5. Variable speed drive system according to claim 4, further comprising respective means for controling the distance between the flanges of each pulley to which the respective movable flange is coupled and a spring cooperating with said movable flange of said driven pulley to urge it axially towards said other flange of said driven pulley.

6. Variable speed drive system according to claim 5, wherein said spring is a coil spring disposed around said hub and bearing on said movable flange of said driven pulley and said annular abutment member.

* * * * *